(12) United States Patent
Takano et al.

(10) Patent No.: US 8,874,509 B2
(45) Date of Patent: Oct. 28, 2014

(54) DATABASE MANAGEMENT METHOD, APPARATUS AND SYSTEM

(75) Inventors: Kohji Takano, Kanagawa-ken (JP); Sawa Takano, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1285 days.

(21) Appl. No.: 12/325,517

(22) Filed: Dec. 1, 2008

(65) Prior Publication Data

US 2009/0157773 A1    Jun. 18, 2009

(30) Foreign Application Priority Data

Dec. 13, 2007   (JP) .................................. 2007-321621

(51) Int. Cl.
*G06F 17/30*   (2006.01)

(52) U.S. Cl.
CPC ................................ *G06F 17/30575* (2013.01)
USPC ............................ 707/611; 709/203; 709/248

(58) Field of Classification Search
USPC ............................ 707/204, 611; 709/203, 248
See application file for complete search history.

(56) References Cited

U.S. PATENT DOCUMENTS

| | | | | |
|---|---|---|---|---|
| 6,148,412 A * | 11/2000 | Cannon et al. | ............... | 714/6.31 |
| 7,054,955 B2 * | 5/2006 | Chen et al. | ..................... | 709/248 |
| 7,149,813 B2 * | 12/2006 | Flanagin et al. | ............... | 709/248 |
| 7,756,825 B2 * | 7/2010 | Khosravy et al. | ............. | 707/611 |
| 7,877,628 B2 * | 1/2011 | Boyd et al. | ........................ | 714/13 |
| 2004/0230648 A1 * | 11/2004 | Teh et al. | ....................... | 709/203 |
| 2005/0228812 A1 | 10/2005 | Hansmann et al. | | |

FOREIGN PATENT DOCUMENTS

| | | |
|---|---|---|
| JP | 63132351 A | 6/1988 |
| JP | 2000501532 A | 2/2002 |
| JP | 200518370 A | 1/2005 |
| JP | 200525362A A | 1/2005 |
| JP | 200538030A A | 2/2005 |
| JP | 2005535947 | 11/2005 |

OTHER PUBLICATIONS

IBM DB2 Everyplace V9.1, Mobile data base and synchronous building in/solution, Announcement of DB2 Everyplace V9.1(Jul. 28, 2006), 2 pages.

* cited by examiner

*Primary Examiner* — Etienne Leroux
*Assistant Examiner* — Chelcie Daye
(74) *Attorney, Agent, or Firm* — Yuanmin Cai

(57) ABSTRACT

A technique for appropriately managing a database in an apparatus with a limited storage capacity is described. A client apparatus includes a first storage unit storing part of a record set included in a database of a database server apparatus, and a second storage unit storing a copy of the record set stored in the first storage unit. The client apparatus usually searches the second storage unit. If data is not found, the client apparatus transmits a search request to the database server apparatus and stores a search result in the second storage unit. When the client apparatus receives update data from the database server apparatus, the client apparatus performs processing of updating the first storage unit.

12 Claims, 10 Drawing Sheets

Figure 5

| ORDER | RECORD ID |
|---|---|
| 1 | data#1 |
| ... | ... |
| K | data#K |
| ... | ... |
| L | data#L |
| ... | ... |
| M | data#M |

(a) ORDER LIST FOR TABLE A

| RECORD ID | THE NUMBER OF SEARCHES |
|---|---|
| data#190 | 102 |
| data#200 | 80 |
| ... | ... |
| data#136 | 45 |
| ... | ... |
| data#201 | 7 |

(b) SEARCH INFORMATION FOR TABLE A

Figure 6

```
<?xml version="1.0" encoding="UTF-8"?>
<db>
    <dbName="AA", action="insert" param="xxxxxx"/>
    <dbName="BB", action="delete" param="xxxxxx"/>
    <dbName="AA", action="update" param="xxxxxx"/>
            .
            .
            .
</db>
```

DATABASE MANAGEMENT METHOD, APPARATUS AND SYSTEM

CLAIM OF PRIORITY

This application claims priority to Japanese Application No. 2007-321621 filed on Dec. 13, 2007, the entire content of which is incorporated by reference herein.

FIELD OF THE INVENTION

The present invention relates to database management methods, and more particularly to a technique for managing a database in an apparatus with a limited storage capacity, such as a mobile information terminal or an embedded device.

BACKGROUND

In apparatuses with a limited storage capacity, such as mobile information terminals, handheld personal computers, mobile phones, and embedded devices, there is an increasing need to use a database as the amount and types of data processed in such apparatuses are increasing. Recently, databases for use in such apparatuses with a limited storage capacity have been available from a number of vendors. These available databases are designed to operate with a small amount of memory. For example, some database products, such as DB2 (trademark) Everyplace (trademark) products of IBM Corporation, can update data in cooperation with an external database server.

However, even with the use of the databases for embedded devices available from the vendors, there is a limit to the amount of data storable in an apparatus with a limited storage capacity like an embedded device. As a measure to address too much data to store, a possible method may be to store no data in the embedded device and to access an external database server via a communication line as necessary. However, the problems in this case are that the response is slow because data is requested every time it is required, and that the data cannot be accessed where communications are unavailable.

SUMMARY

To address the aforementioned problems, it may be possible to extract a set of partial records that fit into the storage capacity of the embedded device from all records maintained in the database server and to load the record set into the embedded device, and then to synchronize the embedded device and the database server. In this method, however, if data not included in the partial record set is required, cumbersome tasks need to be performed including first modifying the content of a database of the partial record set in the database server and then synchronizing the embedded device and the database again.

It is an object of the present invention to reduce the number of accesses from the embedded device to the database server by increasing the hit rate in searching a database in the embedded device. More specifically, it is an object of the present invention to store, as part of a record set stored in the database of the embedded device, data likely to be searched for, and to regularly update the database of the embedded device. It is a further object of the present invention to more simplify such updating of the database of the embedded device, thereby minimizing the update load on the database server and the device.

A client apparatus is described having a communication unit communicating with a database server apparatus over a network; a first storage unit storing part of a record set included in a database of the database server apparatus; a second storage unit storing a copy of the record set stored in the first storage unit; a management unit copying the record set from the first storage unit to the second storage unit and managing the first and second storage units; and a searching unit searching the second storage unit in response to a search request for data from a user. In response to absence of the requested data in the second storage unit, the searching unit requests the data from the database server apparatus via the communication unit and stores a record containing the requested data returned from the database server apparatus in the second storage unit, and the management unit updates the record set stored in the first storage unit by using update data for updating part of the record set included in the database, the update data being received from the database server apparatus via the communication unit. The first storage unit is nonvolatile memory, and the second storage unit is volatile memory. The client apparatus may be an embedded device. In one particular embodiment, the management unit copies the record set from the first storage unit to the second storage unit in response to resumption of power supply to the second storage unit after shutoff of the power supply. In another embodiment, the management unit deletes a record for which few search requests have been made from the second storage unit if the second storage unit has no available space to add the record containing the requested data returned from the database server apparatus. Furthermore, the update performed by the management unit for the record set stored in the first storage unit comprises at least one of addition of one or more records, deletion of one or more records, and modification of one or more records.

A system is also described. The system includes a database server apparatus and a plurality of client apparatuses connecting to the database server apparatus over a network. Each client apparatus includes: a communication unit communicating with the database server apparatus over the network; a first storage unit storing part of a record set included in a database of the database server apparatus; a second storage unit storing a copy of the record set stored in the first storage unit; a management unit managing the first and second storage units, the management unit updating the record set stored in the first storage unit and copying the record set from the first storage unit to the second storage unit; and a searching unit searching the second storage unit in response to a search request for data from a user of the client apparatus and, if the data is not found, transmitting a search request to the database server apparatus and storing a record containing the data returned from the database server apparatus in the second storage unit. The database server apparatus includes the database; a database management unit searching the database in response to a search request for data not included in the second storage unit from each client apparatus; a search information recording unit recording the number of searches for each record; an order list storage unit storing an order list of the records commonly stored in the first storage unit of each client apparatus; and an update data generation unit generating, based on the number of searches and the order list, update data for updating the record set commonly stored in the first storage unit of each client apparatus. In one particular embodiment, the update data comprises one or more records to be added to the record set stored in the first storage unit of the client apparatus, and information about one or more records to be deleted from the record set. In another embodiment, the order list of the records commonly stored in the first storage unit of each client is an order list in terms of recency of the records.

A database management method performed in a client apparatus capable of communicating with a database server apparatus over a network is also described. The database management method includes the steps of storing, in a first storage unit, part of a record set included in a database of the database server apparatus; copying the record set stored in the first storage unit to a second storage unit; searching the second storage unit in response to a search request for data from a user of the client apparatus; in response to absence of the requested data in the second storage unit, requesting the data from the database of the database server apparatus and storing a record containing the data returned from the database server apparatus in the second storage unit; and updating the record set stored in the first storage unit in response to reception of update data for updating part of the record set included in the database from the database server apparatus. In one embodiment, the first storage unit is nonvolatile memory, and the second storage unit is volatile memory, and the copying is performed in response to resumption of power supply to the second storage unit after shutoff of the power supply.

A database management method performed in a system having a database server apparatus and a plurality of client apparatuses connecting to the database server apparatus over a network, wherein each client apparatus comprises a first storage unit storing part of a record set included in a database of the database server apparatus and a second storage unit storing a copy of the record set stored in the first storage unit is described. In each client apparatus, the method includes searching the second storage unit in response to a search request for data from a user; in response to absence of the requested data in the second storage unit, requesting the data from the database of the database server apparatus and storing a record containing the data returned from the database server apparatus in the second storage unit; and updating the record set stored in the first storage unit. In the database server apparatus, the method includes searching the database in response to a request for data not included in the second storage unit from each client apparatus; recording the number of searches for each record; and with reference to an order list of the record set commonly stored in the first storage unit of each client apparatus and the number of searches, generating update data for updating the record set commonly stored in the first storage unit of each client apparatus.

BRIEF DESCRIPTION OF THE DRAWINGS

Embodiments of the present invention will now be described by way of example with reference to the accompanying drawings in which like references denote similar elements, and in which.

FIG. 5(a) is a diagram showing an exemplary order list of records stored in a master DB;

FIG. 5(b) is a diagram showing exemplary record-by-record search information in the database server apparatus;

FIG. 6 is a diagram showing exemplary update data generated by the database server apparatus;

DETAILED DESCRIPTION

Figure 1:
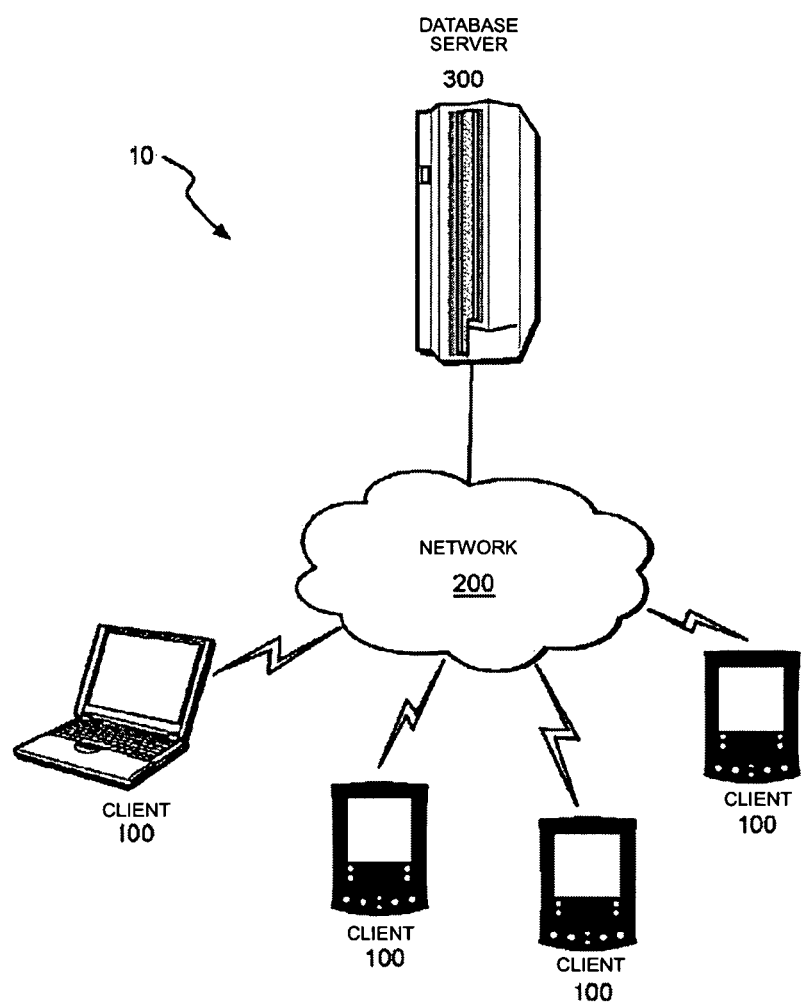
FIG. 1 is a diagram showing an exemplary general configuration of a database management system, according to an embodiment of the present invention.

The present invention achieving the above objects is implemented as a client apparatus capable of connecting to a database server apparatus over a network, including: a communication unit communicating with the database server apparatus over the network; a first storage unit storing part of a record set included in a database of the database server apparatus; a second storage unit storing a copy of the record set stored in the first storage unit; a management unit copying the record set from the first storage unit to the second storage unit and managing the first and second storage units; and a searching unit searching the second storage unit in response to a search request for data from a user of the client apparatus.

Here, the client apparatus is preferably an apparatus with a limited storage capacity, such as a handheld personal computer, mobile phone, or embedded device. In response to absence of the requested data in the second storage unit, the searching unit requests the data from the database server apparatus via the communication unit and stores a record containing the requested data returned from the database server apparatus in the second storage unit. The management unit updates the record set in the first storage unit by using update data for updating part of the record set included in the database, the update data being received from the database server apparatus via the communication unit.

Preferably, the first storage unit is nonvolatile memory, and the second storage unit is volatile memory. The management unit preferably copies the record set from the first storage unit to the second storage unit in response to resumption of power supply to the second storage unit after shutoff of the power supply. An exemplary case when the power supply to the second storage unit is shut off may be when a battery is exhausted. The update of the record set in the first storage unit preferably includes at least one of addition of one or more new records, deletion of one or more existing records, and modification of one or more existing records.

The management unit preferably deletes a record for which few search requests have been made from the second storage unit if the second storage unit has no available space to add the record containing the requested data returned from the database server apparatus.

The present invention achieving the above objects is implemented as a system including a database server apparatus and a plurality of client apparatuses connecting to the database server apparatus over a network.

Each client apparatus includes: a communication unit communicating with the database server apparatus over the network; a first storage unit storing part of a record set included in a database of the database server apparatus; a second storage unit storing a copy of the record set stored in the first storage unit; a management unit managing the first and second storage units, the management unit updating the record set stored in the first storage unit and copying the record set from the first storage unit to the second storage unit; and a searching unit searching the second storage unit in response to a search request for data from a user of the client apparatus and, if the data is not found, transmitting a search request to the database server apparatus and storing a record containing the data returned from the database server apparatus in the second storage unit.

The database server apparatus includes: the database; a database management unit searching the database in response to a search request for data not included in the second storage unit from each client apparatus; a search information recording unit recording the number of searches for each record; an order list storage unit storing an order list of the records commonly stored in the first storage unit of each client apparatus; and an update data generation unit generating, based on the number of searches and the order list, update data for updating the record set commonly stored in the first storage unit of each client apparatus.

The update data preferably includes a set of one or more records to be newly added to the first storage unit, and information about one or more existing records to be deleted from the first storage unit. The update data may further include information about modification of one or more existing records stored in the first storage unit.

The order list of the records stored in the first storage unit is preferably an order list in terms of recency of the records.

Thus, the present invention has been described as a database management client apparatus and system. The present invention may also be implemented as a database management method performed in such a client apparatus or system.

According to the present invention, the client apparatus includes the first storage unit and the second storage unit, and stores a search result returned from the database server apparatus in the second storage unit. Therefore, the content of the record set stored in the first storage unit can be left unchanged after the last update. As a result, the database update can be performed for the first storage unit whose content is known to the database server apparatus, so that the update load on the database server apparatus and the client apparatus is reduced.

Since the record set stored in the first storage unit can be made common to all client apparatuses, the database server apparatus can generate the update data common to all client apparatuses. This reduces the load on the database server apparatus in updating the database.

The database server apparatus according to the present invention generates the update data based on the number of searches for each record performed by each client apparatus. Therefore, each client apparatus can increase the hit rate in searching the first storage unit, and therefore in the second storage unit storing the copy of the first storage unit.

Best mode for carrying out the present invention will be described in detail below with reference to the drawings. The following embodiments are not intended to limit the present invention set forth in the claims, and not all combinations of features described in the embodiments are necessarily essential to the solution provided by the present invention.

FIG. 1 is a diagram showing an exemplary general configuration of a database management system 10 according to an embodiment of the present invention. The system 10 includes a database server apparatus 300 that connects to a network 200 such as the Internet or LAN (Local Area Network) to respond to search requests from a plurality of client apparatuses 100, and the client apparatuses 100 that connect to the network 200 to request the database server apparatus 300 to perform a search.

Each client apparatus 100 according to the present invention has a database storing part of a record set included in a database of the database server apparatus 300, and usually searches its own database. If a search request is made for data not included in the database of the client apparatus 100, the client apparatus 100 connects to the database server apparatus 300 using any appropriate protocol, for example, TCP (Transmission Control Protocol) or HTTP (HyperText Transfer Protocol), and requests the data. Database accesses of a communication application in the database server apparatus 300 may be performed via a standard interface, such as ODBC (Open DataBase Connectivity) or JDBC (Java®(trademark) DataBase Connectivity).

Upon receiving a data search request from a client apparatus 100, the database server apparatus 300 records a history of the search request and counts the number of search requests from the client apparatuses 100 for each record. When the history record reaches a certain amount, or regularly, the database server apparatus 300 generates, based on the number of search requests, update data for updating the database of the client apparatuses 100. The client apparatus 100 receives a record including the requested data from the database server apparatus 300 as a search result and stores the received record in its own database for a next search request for the same data.

Generally, updating the content of a database requires knowing which records are included in the original database. This is because an error will be returned to the update processing if a record to be added is already in the database or if a record to be modified or deleted has been deleted from the database. Therefore, if each client apparatus 100 could freely modify its own database, the database server apparatus 300 generating the update data would need to monitor update processing for the database of each client apparatus 100 and generate the update data unique to each client apparatus 100.

On the other hand, if the database server apparatus 300 would generate the update data common to all client apparatuses 100, each client apparatus 100 would need to record all updates performed for the database during the period between the last update and the current update, and to return the database to the state just after the last update before updating the database. Therefore, the update would require much time.

The client apparatus 100 according to the present invention includes two databases, i.e., a nonvolatile first storage unit (hereinafter referred to as a master DB) storing part of a record set included in the database of the database server apparatus, and a volatile second storage unit (hereinafter referred to as a copy DB) storing a copy of the record set stored in the first storage unit. The client apparatus 100 usually searches the copy DB for data, and stores a search result returned from the database server apparatus 300 in the copy DB. As a result, the content of the master DB is common to all client apparatuses 100, so that the database server apparatus 300 can generate the update data common to all client apparatuses 100. In addition, searching the copy DB realizes fast search processing.

When the client apparatus 100 receives the update data from the database server apparatus 300, the client apparatus 100 updates the master DB using the update data. Also, when the power supply to the copy DB is shut off, the client apparatus 100 copies the record set from the master DB to the copy DB in response to resumption of the power supply to the copy DB. Since the update data is generated based on the number of data searches in the database server apparatus 300, the hit rate of the client apparatus 100 in performing data searches in the copy DB increases.

Figure 2:
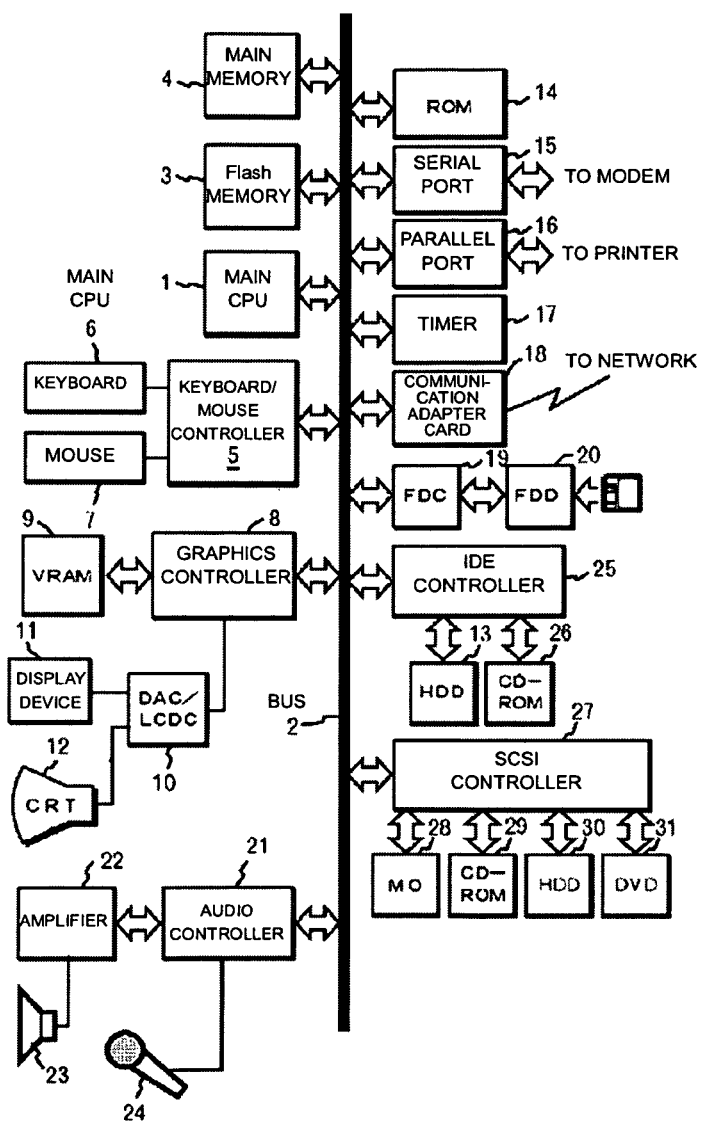
FIG. 2 is a diagram showing an exemplary hardware configuration of a computer system, according to the embodiment of the present invention.

FIG. 2 is a diagram showing an exemplary hardware configuration of an information processing apparatus appropriate for implementing the database server apparatus 300 according to the embodiment of the present invention. The information processing apparatus includes a CPU (Central Processing Unit) 1 and a main memory 4 that are connected to a bus 2. Hard disk devices 13 and 30, and removable storage (external storage systems in which recording media are changeable) such as CD-ROM devices 26 and 29, a flexible disk device 20, an MO device 28, and a DVD device 31 are connected to the bus 2 via controllers such as a flexible disk controller 19, an IDE controller 25, and a SCSI controller 27.

Storage media such as a flexible disk, MO, CD-ROM, and DVD-ROM are inserted into the removable storage. Computer program code for giving instructions to components such as the CPU in cooperation with an operating system and carrying out the present invention can be recorded in these storage media, the hard disk devices 13 and 30, and a ROM 14.

Thus, the above-described various storage devices can store a DBMS (DataBase Management System) implementing database functions, and an update data generation program for generating the update data for updating the database of the client apparatuses 100. These computer programs are executed by loading them into the main memory 4. The computer programs may be compressed and also may be divided into a plurality of parts to be recorded in a plurality of media.

The storage devices such as the hard disk devices 13 and 30 also store various kinds of data shared among the client apparatuses 100. In the embodiment of the present invention, the database server apparatus 300 functions as a relational database, and the various kinds of data are stored in tabular form in the storage devices such as the hard disk devices 13 and 30.

The information processing apparatus receives inputs from input devices such as a keyboard 6 and a mouse 7 via a keyboard/mouse controller 5. The information processing apparatus receives an input from a microphone 24 and outputs sound from a speaker 23 via an audio controller 21. The information processing apparatus is connected, via a graphics controller 8, to a display device 11 for presenting visual data to a user. The information processing apparatus can connect to a network via a network adapter 18 (an Ethernet® (registered trademark) card or a token ring card) or the like and communicate with other computers and so on.

An information processing apparatus appropriate for implementing the client apparatuses 100 according to the embodiment of the present invention also has basically the same hardware configuration as the database server apparatus 300 described with reference to FIG. 2. That is, each client apparatus 100 includes: the CPU 1 that performs operations and controls program and data flows; the main memory 4 that stores programs and data and also stores a processing result returned from the CPU 1; an input device, such as the keyboard 6, that receives various external inputs; an output device, such as the display device 11, that outputs a processing state and a processing result of the information processing apparatus; and a communication device that communicates with other computers and so on.

However, the client apparatus 100 such as an embedded device generally does not include a sufficient storage device like the database server apparatus 300 does. The client apparatus 100 without a storage device such as the hard disk device 13 or 30 records an operating system, and computer program code for giving instructions to components such as the CPU in cooperation with the operating system and carrying out the present invention, in the ROM 14 and the Flash memory 3 for example.

Thus, the ROM 14 and the Flash memory 3 of the client apparatus 100 can store a database management program carrying out the present invention, and various application programs providing various functions to the client apparatus 100. These computer programs are executed by loading them into the main memory 4. The client apparatus 100 according to the embodiment uses the Flash memory 3 as the master DB and uses part of the main memory 4 as the copy DB. However, this configuration is only an example for describing the present invention and does not prevent the client apparatus 100 with a hard disk device from using the hard disk device as the master DB.

Figure 3:
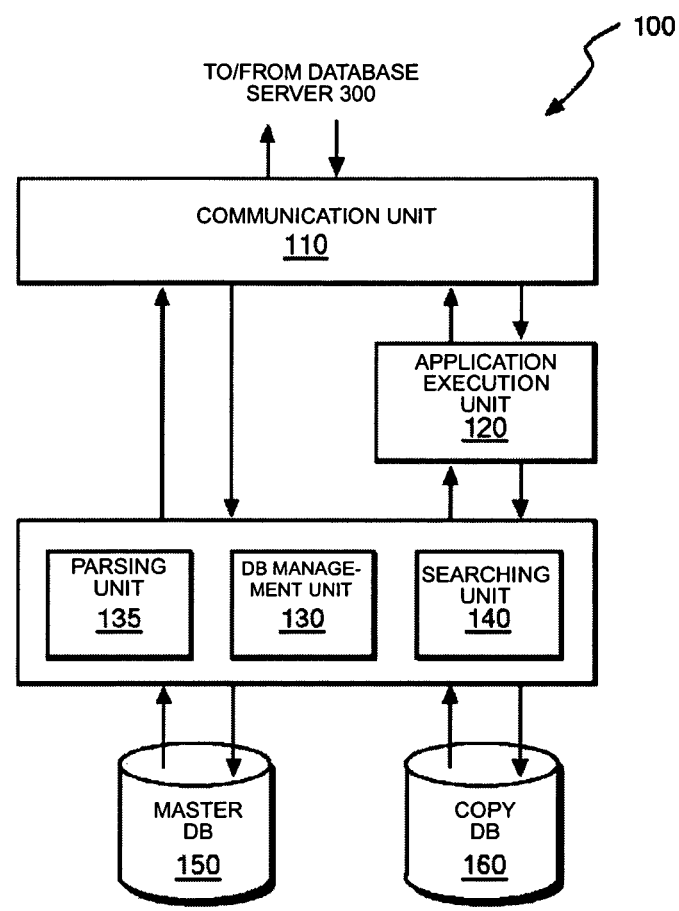
FIG. 3 is a diagram showing an exemplary functional configuration of a client apparatus, according to an embodiment of the present invention.

FIG. 3 shows an exemplary functional configuration of the client apparatus 100 according to an embodiment of the present invention. The client apparatus 100 includes a communication unit 110, an application execution unit 120, a database management unit 130, a searching unit 140, a master DB 150, and a copy DB 160.

The communication unit 110 communicates with the database server apparatus 300 via the network 200.

The master DB 150 stores part of a record set included in the database of the database server apparatus 300 to be described later. The master DB 150 is implemented as a nonvolatile storage device, and as described above, the Flash memory 3 is used as the master DB 150 in an example of the present invention. The record set stored in the master DB 150 is common to all client apparatuses 100.

The copy DB 160 stores a copy of the record set stored in the master DB 150. The copy DB 160 is implemented as a volatile storage device, and as described above, part of the main memory 4 is used as the copy DB 160 in an example of the present invention.

The database management unit 130 copies the record set from the master DB 150 to the copy DB 160 and manages the master DB 150 and the copy DB 160. In response to resumption of the power supply to the copy DB 160 after shutoff of the power supply, the database management unit 130 copies the record set from the master DB 150 to the copy DB 160. Also, upon receiving the update data from the database server apparatus 300 to be described later via the communication unit 110, the database management unit 130 uses the update data to update the record set stored in the master DB 150. Details of the update of the record set stored in the master DB 150 will be described later with reference to FIGS. 5 and 6.

The application execution unit 120 executes an application (function) designated by a user via the input device. The application executed by the application execution unit 120 may use data stored in the copy DB 160. Such an application may access the data via a standard interface, for example, ODBC (Open DataBase Connectivity) or JDBC (Java® (registered trademark) DataBase Connectivity).

The searching unit 140 performs search processing for the copy DB 160 in response to a search request from the user of the client apparatus 100. The search request from the user may be made via an application executed by the application execution unit 120, and a search result is returned to the user, for example via the output device such as the display device 11.

In response to the absence of the requested data in the copy DB 160, the searching unit 140 connects to the database server apparatus 300 via the communication unit 110 and requests the database server apparatus 300 to search for the data. Upon receiving a record including the requested data from the database server apparatus 300 via the communication unit 110, the searching unit 140 returns the record to the user, for example via the output device such as the display device 11. Also, in response to the searching unit 140 receiving the record from the database server apparatus 300, the database management unit 130 checks that the copy DB 160 has an available space.

If the copy DB 160 has no available space and cannot store the returned record, the database management unit 130 deletes from the copy DB 160 a record for which few search requests have been made, in other words, a record accessed few times, for example. The searching unit 140 then stores the record received from the database server apparatus 300 in the copy DB 160.

Figure 4:
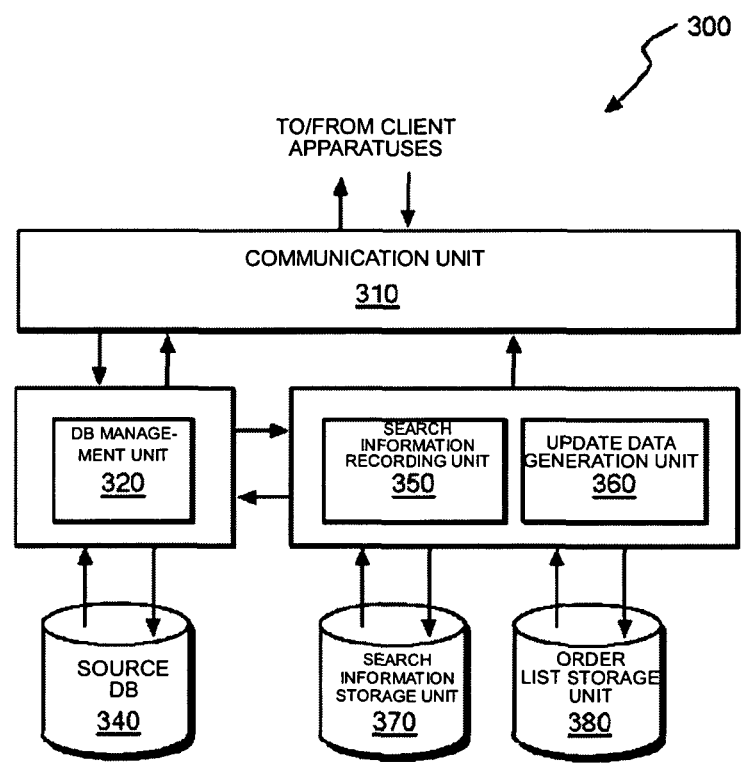
FIG. 4 is a diagram showing an exemplary functional configuration of a database server apparatus, according to an embodiment of the present invention.

FIG. 4 shows an exemplary functional configuration of the database server apparatus 300 according to an embodiment of the present invention. The database server apparatus 300 includes a communication unit 310, a database management unit 320, a source database 340, a search information recording unit 350, an update data generation unit 360, a search information storage unit 370, and an order list storage unit 380.

The communication unit 310 communicates with the client apparatuses 100 via the network 200.

The source database (hereinafter referred to as a source DB) 340 stores various kinds of data shared among the client apparatuses 100. As an example, the data stored in the source DB 340 may be data that is read-only for the client apparatuses 100, such as karaoke music. As described above, in the embodiment of the present invention, the database server apparatus 300 functions as a relational database, and the source DB 340 stores various kinds of data in tabular form.

The order list storage unit 380 stores order lists for partial records extracted from the source DB and stored in the master DB 150 of each client apparatus 100. As an example, the order list may be an order list in terms of recency of the records.

FIG. 5(*a*) shows an exemplary order list stored in the order list storage unit 380. In the order list shown in FIG. 5(*a*), partial records in a table A extracted from the source DB are listed in order from latest creation date. It is assumed that a set of records up to the order M out of the records in the table A are initially stored in the master DB 150 of each client apparatus 100. The order list storage unit 380 stores order lists for all tables stored in the master DB 150 of each client apparatus 100.

The database management unit 320 manages the source DB. In the embodiment of the present invention, the database management unit 320 is implemented as an RDBMS (Relational DataBase Management System) by using, for example, a DB2 (registered trademark) database management system of IBM Corporation, a Microsoft (registered trademark) SQL server system of Microsoft Corporation, an Oracle (registered trademark) database management system of Oracle Corporation, a database management system of Sybase Inc., or the like.

The database management unit 320 searches the source DB 340 in response to a search request from each client apparatus 100 requesting data not included in the copy DB 160. The search result is returned to the client apparatus 100 via the communication unit 310.

The search information storage unit 370 stores information about the number of searches for each record in association with that record. In response to search processing performed by the database management unit 320, the search information recording unit 350 reads out the number of searches for the record in question from the search information storage unit 370 and updates the number of searches.

FIG. 5(*b*) shows exemplary record-by-record search information for the table A. Here, the number of searches denotes the total number of search requests from all client apparatuses 100. The search information storage unit 370 stores search information as shown in FIG. 5(*b*) for all tables included in the copy DB 160 of each client apparatus 100.

Based on the record-by-record search information stored in the search information storage unit 370 and the record order lists stored in the order list storage unit 380, the update data generation unit 360 generates the update data for updating the record set commonly stored in the master DB 150 of each client apparatus 100.

The update data generated by the update data generation unit 360 may include at least one of the following: one or more records to be added to the master DB 150 of each client apparatus 100, information about one or more records to be deleted from the record set stored in the master DB 150, and modification information about any one or more records in the record set stored in the master DB 150.

The update data generation unit 360 may generate the update data regularly, for example, once a day. Alternatively, the update data generation unit 360 may generate the update data in response to the number of records searched for more than a predetermined times F reaching a certain number C. Here, the update data generated by the update data generation unit 360 will be described for the latter case with reference to FIGS. 5 and 6. As shown in FIG. 5(*b*), it is assumed that records searched for more than the predetermined times (F=40) reaches the certain number C.

The update data generation unit 360 queries the database management unit 320 for the C records searched for more than the predetermined times F and reads out these records from the source DB 340. The update data generation unit 360 then reads out the order list of the corresponding table from the order list storage unit 380 and obtains IDs of consecutive C records from the bottom of the list. The update data generation unit 360 adds the C records retrieved from the source DB 340 to the order list and moves down the original order of records by C. At this point, the C records from the bottom are deleted from the order list. Also, the C records searched for more than the predetermined times F are deleted from the record-by-record search information stored in the search information storage unit 370. Finally, the update data generation unit 360 generates the update data, in which the record set read out from the source DB 340 is included as records to be added and the record IDs read out from the order list storage unit 380 are included as records to be deleted. The update data generation unit 360 may generate the update data under an instruction of a manager of the database server apparatus 300 provided via an input device such as the keyboard 6.

FIG. 6 shows exemplary update data generated by the update data generation unit 360. In this example, the update data is generated as an XML document, and details of modifications are described in a portion enclosed with "db" tabs. Specifically, the modifications are specified using attributes of elements: the table to be modified is specified with a "dbName" attribute, the manner of modification is specified with an "action" attribute, and the record is specified with a "param" attribute. In this example, the manner of modification is specified using SQL (Structured Query Language) language. Upon receiving the XML document of the update data, the database management unit 130 of the client apparatus 100 passes it to a parsing unit 135 and receives, as an output, operational instructions for the master DB 150 and data. The parsing unit 135 may be implemented as an XML parser.

Figure 7:
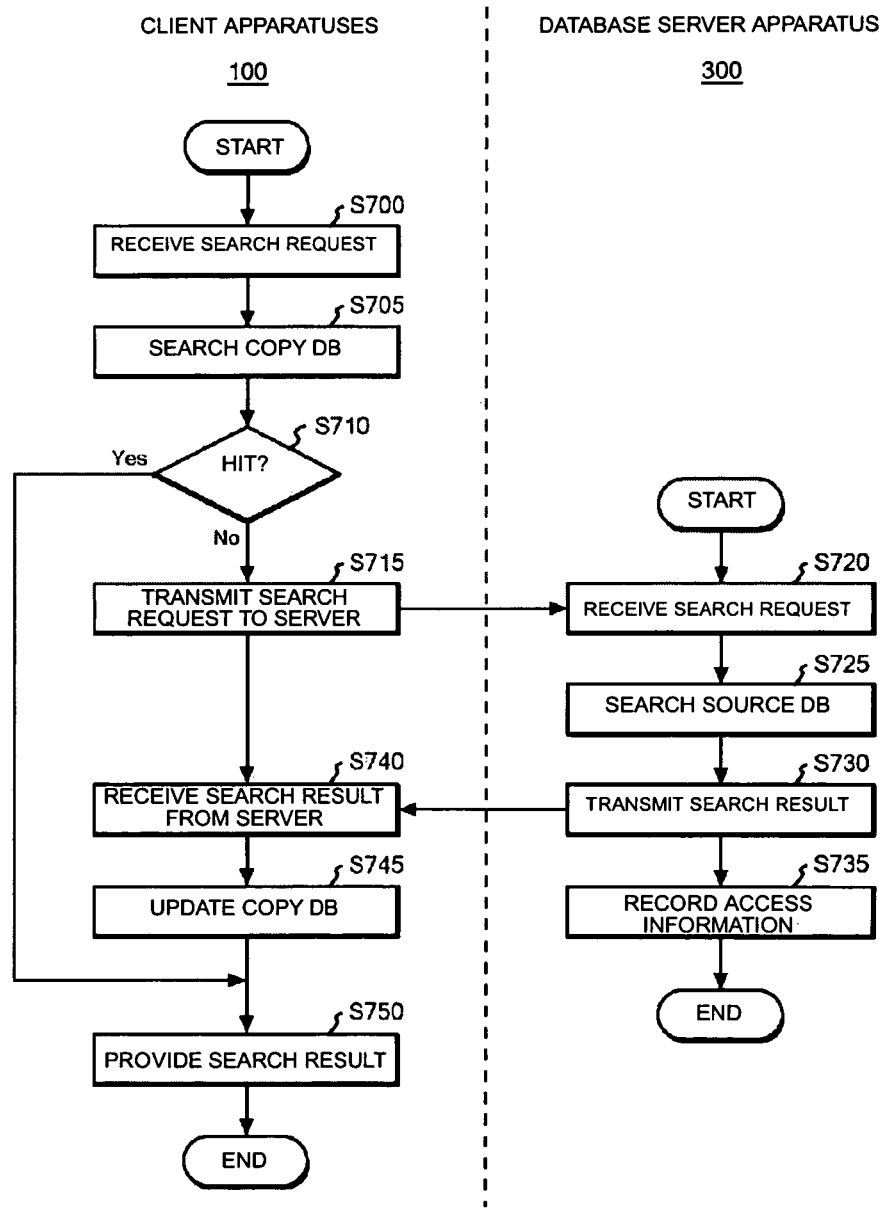
FIG. 7 shows a flowchart illustrating an exemplary flow of search processing in the system.

Now, with reference to flowcharts of FIGS. 7 to 10, a database management method in the system 10 according to this embodiment will be described. FIG. 7 shows an exemplary flow of database query processing performed in the system 10. The processing starts in step 700, where a search request is received from a user via the application execution unit 120. The searching unit 140 searches the copy DB 160 (step 705). If data in question is not found in the copy DB 160

(step 710: NO), the searching unit 140 transmits a search request to the database server apparatus 300 via the communication unit 110 (step 715).

The search request is received in the database server apparatus 300 (step 720), and the database management unit 320 searches the source DB 340 (step 725). If the data in question is found, the database management unit 320 transmits the search result to the client apparatus 100 via the communication unit 310 (step 730). In response to the search processing performed by the database management unit 320, the search information recording unit 350 updates the search information stored in the search information storage unit 370 with respect to the record in question (step 735).

The search result is received in the client apparatus 100 (step 740), and the searching unit 140 stores the record of the search result received from the database server apparatus 300 in the copy DB (step 745). From step 745, or if the data in question is found in the copy DB 160 in step 710, the processing proceeds to step 750. The searching unit 140 returns the search result to the application to provide the search result to the user (step 750). Then the processing terminates.

Figure 8:
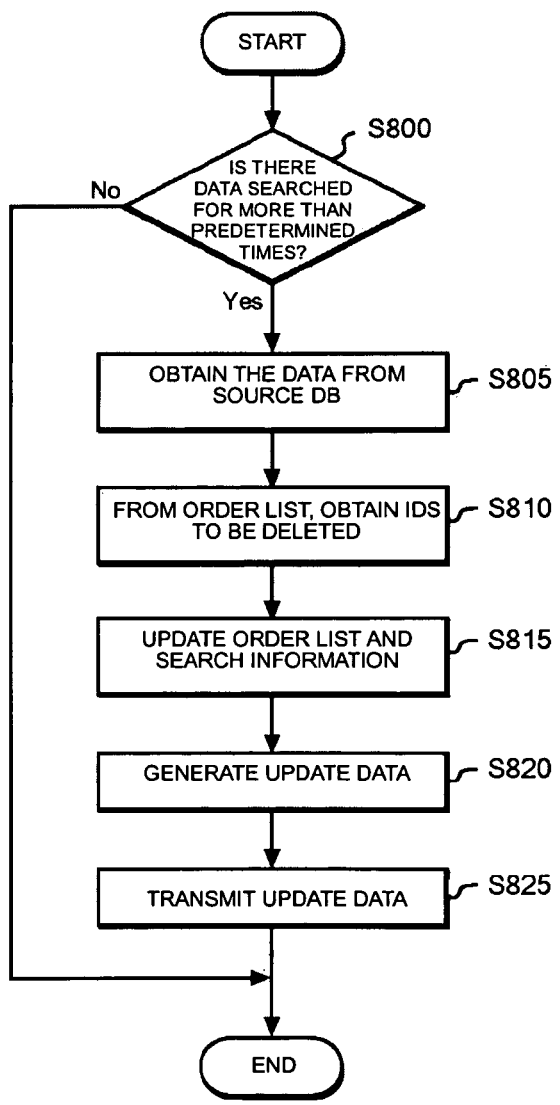
FIG. 8 shows a flowchart illustrating an exemplary flow of update data generation processing in the database server apparatus.

FIG. 8 shows an exemplary flow of update data generation processing performed in the database server apparatus 300. The processing shown in FIG. 8 is processing performed by the update data generation unit 360 at regular intervals. The process starts in step 800, where the update data generation unit 360 reads out the search information from the search information storage unit 370 to determine whether or not the number of records searched for more than the predetermined times F reaches the certain number C. If the certain number C is not reached (step 800: NO), the processing terminates. If the certain number C is reached (step 800: YES), the update data generation unit 360 queries the database management unit 320 for the C records searched for more than the predetermined times F and reads out these records from the source DB 340 (step 805). The update data generation unit 360 also reads out the order list of the corresponding table from the order list storage unit 380 and obtains IDs of consecutive C records from the bottom of the list (step 810).

The processing proceeds to step 815, where the update data generation unit 360 updates the order list by adding the C records retrieved from the source DB 340 to the order list and moving down the original order of records by C. The update data generation unit 360 also deletes the C records retrieved from the source DB 340 from the search information stored in the search information storage unit 370. The update data generation unit 360 generates the update data, in which the record set read out from the source DB 340 is included as records to be added and the record IDs read out from the order list storage unit 380 are included as records to be deleted (step 820). Finally, the update data generation unit 360 transmits the generated update data to each client apparatus 100 via the communication unit 310 (step 825), and the processing terminates.

Figure 9:
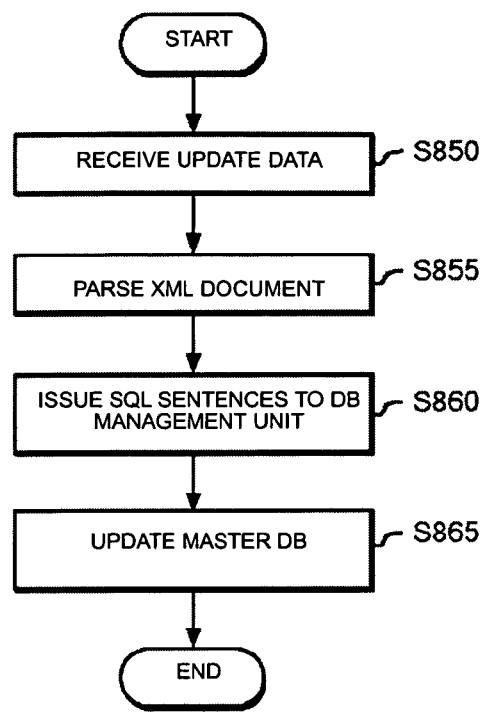
FIG. 9 shows a flowchart illustrating an exemplary flow of database update processing in the client apparatus.
Figure 10:
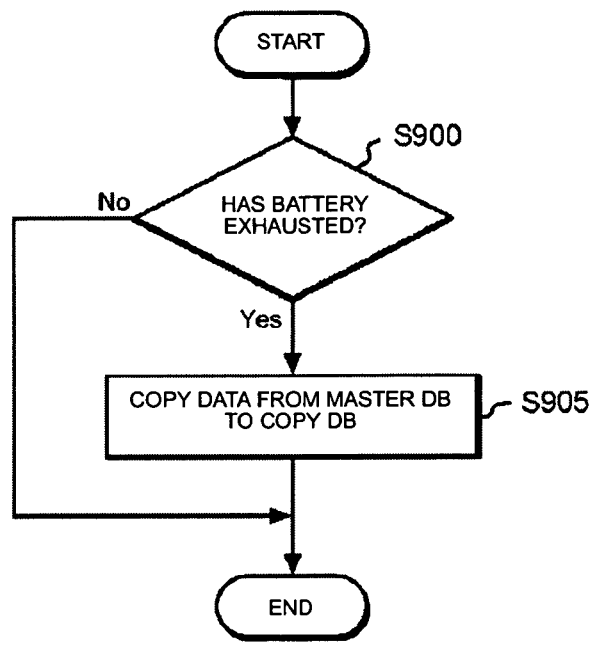
FIG. 10 shows a flowchart illustrating an exemplary flow of database update processing in the client apparatus.

FIGS. 9 and 10 show exemplary flows of database update processing performed in the client apparatus 100. In FIG. 9, the processing starts in step 850, where the database management unit 130 receives the update data from the database server apparatus 300 via the communication unit 110. If the update data has been generated as an XML document, the database management unit 130 passes the update data to the parsing unit 135, which parses the XML document (step 855). Having parsed the XML document, the parsing unit 135 issues SQL sentences to the database management unit 130 (step 860). The database management unit 130 updates the master DB 150 according to the issued SQL sentences (step 865), and the processing terminates.

The processing shown in FIG. 10 is processing performed by the database management unit 130 at power-on. The processing starts in step 900, where the database management unit 130 determines whether or not the power supply to the copy DB has been shut off after the last power-on because of battery exhaustion or the like. If the power is being uninterruptedly supplied, the processing terminates. If the power supply has been shut off and the content of the copy DB 160 has been erased (step 900: YES), the database management unit 130 copies the content of the master DB 150 to the copy DB 160 (step 905), and the processing terminates.

Thus, the present invention has been described with respect to its embodiments. However, the technical scope of the present invention is not limited to the scope described in the above embodiments. It is apparent to those skilled in the art that various modifications and improvements may be made to the above embodiments. Therefore, embodiments with such modifications or improvements made thereto should also fall within the technical scope of the present invention.

The invention claimed is:

1. A client apparatus comprising:
    a communication unit communicating with a database server apparatus over a network;
    a first storage unit storing part of a record set included in a database of the database server apparatus;
    a second storage unit storing a copy of the record set stored in the first storage unit, said copy of the record set disappears from said second storage unit upon losing a power supply;
    a management unit copying the record set from the first storage unit to the second storage unit upon resumption of said power supply to said second storage unit; and
    a searching unit searching the second storage unit in response to a search request for data from a user,
    wherein in response to absence of the requested data in the second storage unit, the searching unit requests the data from the database server apparatus via the communication unit and stores a record containing the requested data returned from the database server apparatus in the second storage unit, and
    the management unit updates the record set stored in the first storage unit by using update data generated by reference to an order list of the record set stored in the first storage unit and the number of searches recorded, and received from the database server apparatus via the communication unit, and deletes a record, from the second storage unit, for which few search requests have been made.

2. The client apparatus according to claim 1, wherein the first storage unit is nonvolatile memory, and the second storage unit is volatile memory.

3. The client apparatus according to claim 2, wherein the management unit copies the record set from the first storage unit to the second storage unit in response to resumption of power supply to the second storage unit after shutoff of the power supply.

4. The client apparatus according to claim 1, wherein the management unit deletes said record for which few search requests have been made from the second storage unit in absence of available space to add the record containing the requested data returned from the database server apparatus.

5. The client apparatus according to claim 1, wherein the client apparatus is an embedded device.

6. The client apparatus according to claim 1, wherein the update performed by the management unit for the record set stored in the first storage unit comprises at least one of addition of one or more records, deletion of one or more records, and modification of one or more records.

7. A system comprising a database server apparatus and a plurality of client apparatuses connecting to the database server apparatus over a network, wherein each client apparatus comprises:
- a communication unit communicating with the database server apparatus over the network;
- a first storage unit storing part of a record set included in a database of the database server apparatus;
- a second storage unit storing a copy of the record set stored in the first storage unit;
- a management unit updating the record set stored in the first storage unit and copying the record set from the first storage unit to the second storage unit following resumption of a power supply to the second storage unit; and
- a searching unit searching the second storage unit in response to a search request for data from a user of the client apparatus and, following determination that the data is not found, transmitting a search request to the database server apparatus and storing a record containing the data returned from the database server apparatus in the second storage unit, and the database server apparatus comprises:
- the database;
- a database management unit searching the database in response to a search request received from the second storage unit from each client apparatus;
- a search information recording unit recording the number of searches for each record;
- an order list storage unit storing an order list of the records commonly stored in the first storage unit of each client apparatus; and
- an update data generation unit generating, based on the number of searches and the order list, update data for updating the record set commonly stored in the first storage unit of each client apparatus.

8. The system according to claim 7, wherein the update data comprises one or more records to be added to the record set stored in the first storage unit of the client apparatus, and information about one or more records to be deleted from the record set.

9. The system according to claim 7, wherein the order list of the records commonly stored in the first storage unit of each client is an order list in terms of recency of the records.

10. A database management method performed in a client apparatus capable of communicating with a database server apparatus over a network, comprising:
- storing, in a first storage unit, part of a record set included in a database of the database server apparatus;
- copying the record set stored in the first storage unit to a second storage unit upon resumption of a power supply to the second storage unit after loss of the copy of the record set by said second storage unit due to a power shutoff;
- searching the second storage unit in response to a search request for data from a user of the client apparatus;
- in response to absence of the requested data in the second storage unit, requesting the data from the database of the database server apparatus and storing a record containing the data returned from the database server apparatus in the second storage unit; and
- updating the record set stored in the first storage unit in response to reception of update data generated by reference to an order list of the record set stored in the first storage unit and the number of searches recorded, for updating part of the record set included in the database from the database server apparatus.

11. The database management method according to claim 10, wherein the first storage unit is nonvolatile memory, and the second storage unit is volatile memory.

12. A database management method performed in a system comprising a database server apparatus and a plurality of client apparatuses connecting to the database server apparatus over a network, wherein each client apparatus comprises a first storage unit of nonvolatile memory storing part of a record set included in a database of the database server apparatus and a second storage unit of volatile memory storing a copy of the record set stored in the first storage unit, the method comprising:
- in each client apparatus,
- searching the second storage unit in response to a search request for data from a user;
- in response to absence of the requested data in the second storage unit, requesting the data from the database of the database server apparatus and storing a record containing the data returned from the database server apparatus in the second storage unit; and
- updating the record set stored in the first storage unit, and
- in the database server apparatus,
- searching the database in response to a request for data not included in the second storage unit from each client apparatus;
- recording the number of searches for each record; and
- with reference to an order list of the record set commonly stored in the first storage unit of each client apparatus and the number of searches, generating update data for updating the record set commonly stored in the first storage unit of each client apparatus.

* * * * *